United States Patent [19]
Liu

[11] Patent Number: 5,881,988
[45] Date of Patent: Mar. 16, 1999

[54] NON-ROTATABLE SEAT ASSEMBLY

[75] Inventor: Kun-Liang Liu, Taichung Hsien, Taiwan

[73] Assignee: Kalloy Industrial Co., Ltd., Taichung Hsien, Taiwan

[21] Appl. No.: 937,505

[22] Filed: Sep. 25, 1997

[51] Int. Cl.⁶ .............................. A47G 29/02; B62J 1/02; B62M 1/00
[52] U.S. Cl. .......................... 248/601; 248/418; 267/132; 280/220; 297/209
[58] Field of Search ..................................... 248/623, 601, 248/600, 599, 622, 418; 297/195.1, 209, 207, 215.13; 280/288.4, 220; 267/132; 403/358, 356, 383, 359

[56] References Cited

U.S. PATENT DOCUMENTS

| | | | |
|---|---|---|---|
| 636,726 | 11/1899 | Hindmarsh | 248/601 |
| 640,483 | 1/1900 | McKenzie | 248/601 |
| 808,004 | 12/1905 | Bryant | 403/358 |
| 2,507,093 | 5/1950 | Collings | 403/356 |
| 2,639,760 | 5/1953 | Von Szilagyi | 248/600 |
| 4,182,508 | 1/1980 | Kallai et al. | 267/132 |
| 4,455,010 | 6/1984 | Butler | 248/576 |
| 4,736,983 | 4/1988 | Furbee | 297/209 |
| 5,044,648 | 9/1991 | Knapp | 248/622 |
| 5,324,058 | 6/1994 | Massaro | 248/600 |
| 5,772,165 | 6/1998 | Schroder | 248/601 |

FOREIGN PATENT DOCUMENTS

| | | | |
|---|---|---|---|
| 361001 | 11/1931 | United Kingdom | 403/383 |
| 560679 | 4/1944 | United Kingdom | 248/601 |
| 2 066 927 | 7/1981 | United Kingdom | 403/356 |

*Primary Examiner*—Leslie A. Braun
*Assistant Examiner*—Michael Nornberg
*Attorney, Agent, or Firm*—Rosenberg, Klein & Bilker

[57] ABSTRACT

A seat assembly includes a seat tube in which a seat post is movably received therein which has a clamping member with a seat disposed thereto. The seat post has two plain portions defined diametrically opposite in an outer periphery thereof and the seat tube has two wedge-shaped recesses defined diametrically opposite in an inner periphery thereof so as to receive two wedge-shaped blocks therein. The seat post extends through a nut member which is threadedly mounted to the seat tube.

3 Claims, 4 Drawing Sheets

NON-ROTATABLE SEAT ASSEMBLY

BACKGROUND OF THE INVENTION

1. Field of the Invention

The present invention relates to a seat assembly and, more particularly, to a seat assembly having a seat post which is not rotated in a seat tube of a bicycle.

2. Brief Description of the Prior Art

A seat assembly for a bicycle includes a seat post received in a seat tube of the bicycle and a clamping member disposed to an upper end of the seat post so that a seat is attached to the clamping member. Generally, the seat post is fixedly clamped by the seat tube so that the seat post is theoretically not rotatable within the seat tube. Unfortunately, in practice, the seat post is rotated within the seat tube when an impact is laterally applied to the seat. This is a troublesome problem especially most of the bicycle riders do not have tools with them.

The present invention intends to provide an improved seat assembly for a bicycle to mitigate and/or obviate the above-mentioned problem.

SUMMARY OF THE INVENTION

In accordance with one aspect of the present invention, therein provided a seat assembly comprising a seat tube having a first end with two wedge-shaped recesses defined diametrically opposite in an inner periphery thereof and a second end with an end cap fixedly received therein. A seat post is movably received in the seat tube and has two plain portions defined diametrically opposite in an outer periphery thereof. A clamping member is securely attached to the seat post and two blocks are respectively received the wedge-shaped recesses and located between the plain portions and the first end of the seat tube.

It is an object of the present invention to provide a seat assembly wherein a seat post thereof is not rotated within the seat tube.

It is another object of the present invention to provide a seat assembly wherein a spring is disposed between the seat post and an end of the seat tube.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
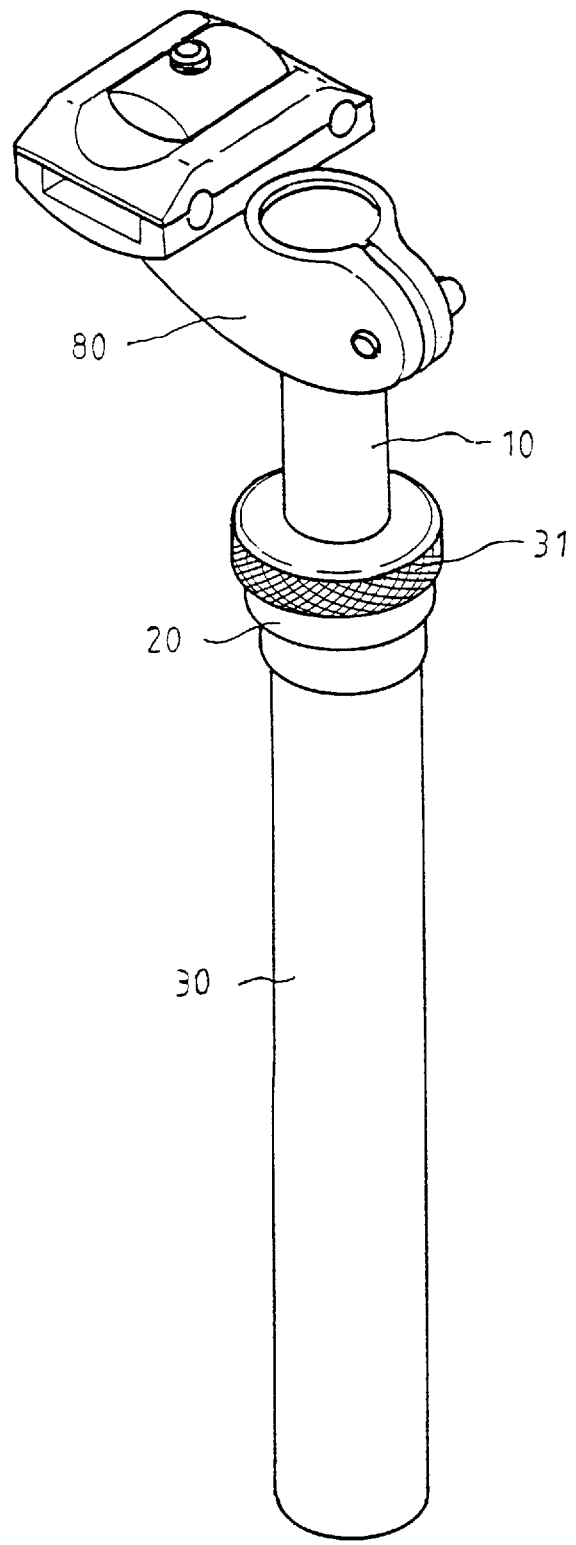
FIG. 1 is a perspective view of a seat assembly in accordance with the present invention.
Figure 2:
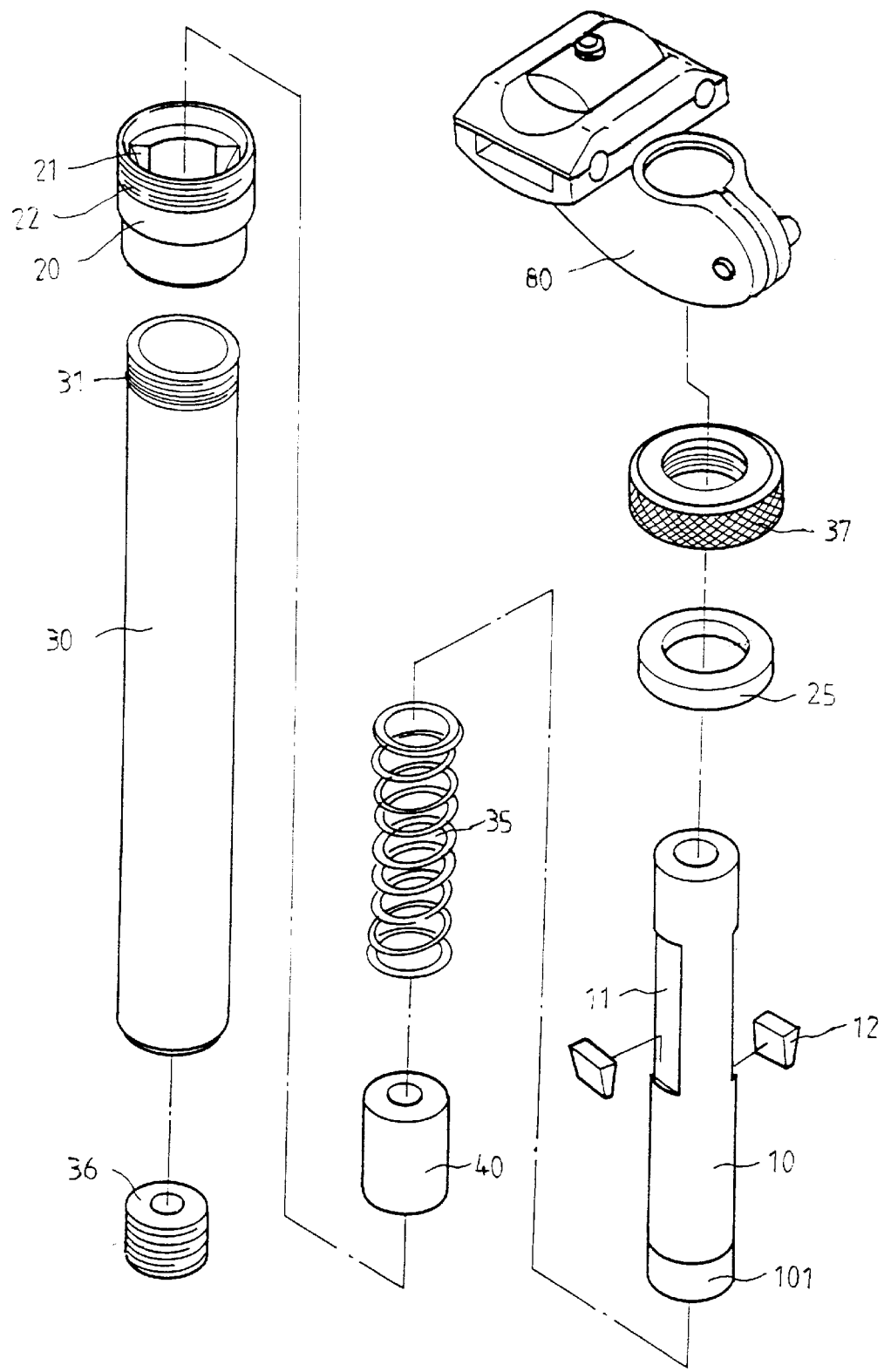
FIG. 2 is an exploded view of the seat assembly in accordance with the present invention.
Figure 3:
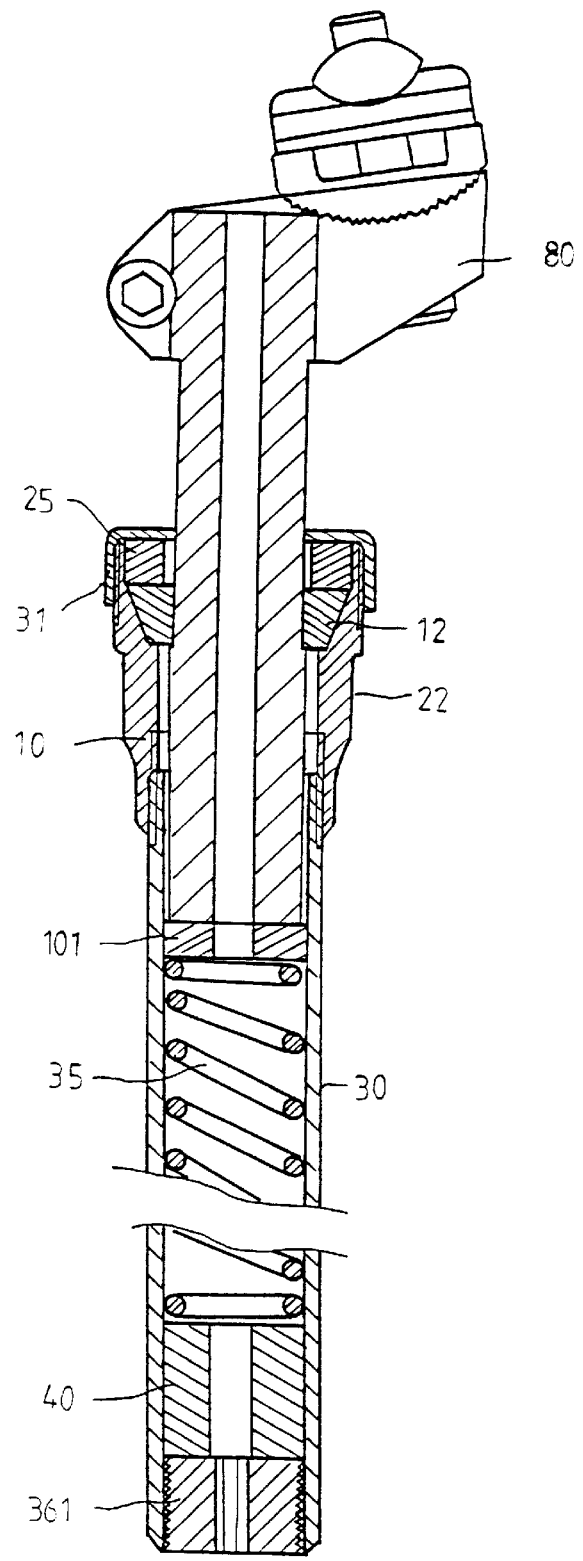
FIG. 3 is a side elevational view, partly in section, of the seat assembly when a spring in a seat tube is not compressed.

Referring to the drawings and initially to FIGS. 1 through 3, a seat assembly in accordance with the present invention generally includes a seat tube 30 having a first end and a second end, the first end thereof having a first threaded periphery 31 defined in an outer periphery thereof and the second end thereof having a tubular member 40 and an end cap 36 which is threadedly and fixedly received therein. An end member 20 is threadedly engaged with the first threaded periphery 31 of the seat tube 30 and has two wedge-shaped recesses 21 defined diametrically opposite in an inner periphery thereof. A second threaded periphery 22 is defined in an outer periphery thereof.

A seat post 10 is axially movable and received in the seat tube 30 and has two plain portions 11 defined diametrically opposite in an outer periphery thereof. A bottom member 101 is fixedly close a lower end of the seat post 10 which has a clamping member 80 securely attached to an upper end thereof. The clamping member 80 is a well known part in a bicycle assembling field so as to securely connect to a seat (not shown).

Two wedge-shaped blocks 12 are respectively received the wedge-shaped recesses 21 and located between the plain portions 11 of the end member 20. A ring 25 is received in the end member 20 and rested on the two wedge-shaped blocks 12, a nut member 37 being threadedly engaged with the second threaded periphery 22 of the end member to press the ring 25 downwardly to retain the two blocks 12 in position such that the seat post 10 is not rotated in the seat tube 30.

A spring 35 is received between the tubular member 40 is the second end of the seat tube 30 and the bottom member 101 of the seat post 10 so that the seat post 10 compresses the spring 35 when the bicycle is ridden on a rough road.

Figure 4:
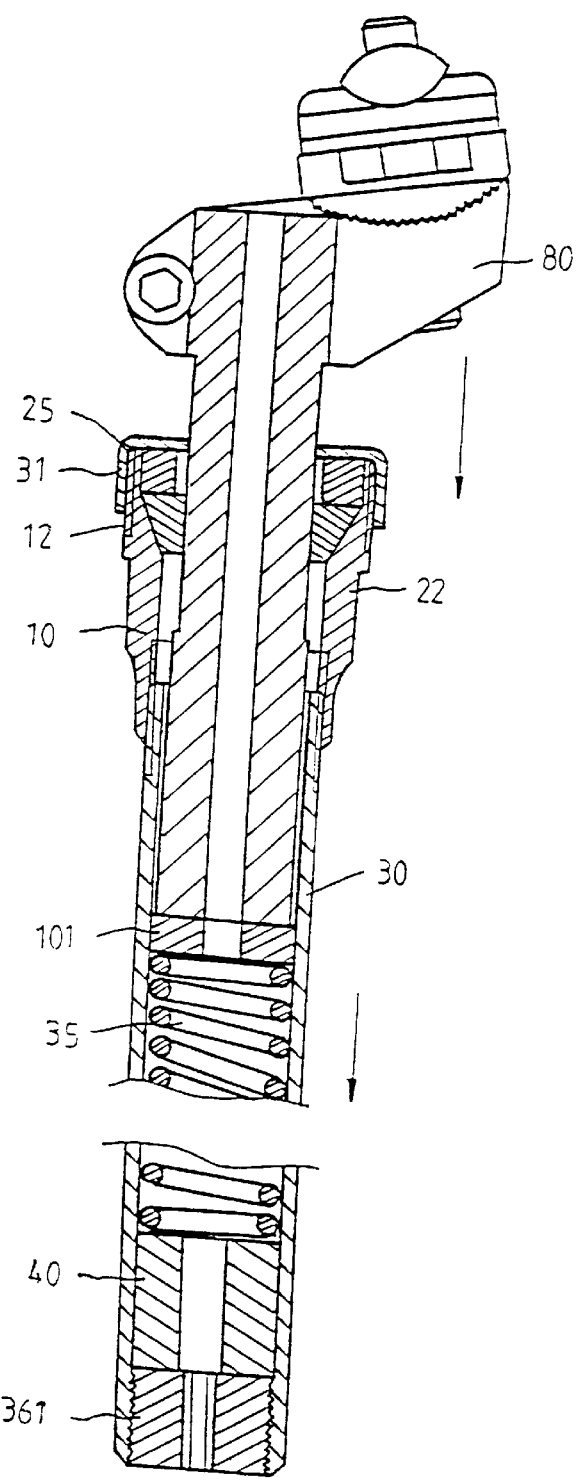
FIG. 4 is a side elevational view, partly in section, of the seat assembly when the spring in the seat tube is compressed.

Referring now to FIG. 4, the spring 35 is compressed by a downward movement of the seat post 10 when a shock is transmitted from the ground so as to provide a comfortable riding condition. The seat post 10 is limited to be rotated within the seat tube 30 by the two wedge-shaped blocks 12 received in the wedge-shaped recesses 21 so that even a lateral force or impact is applied to the seat, the seat will not rotated about the seat post 10.

Although the invention has been explained in relation to its preferred embodiment, it is to be understood that many other possible modifications and variations can be made without departing from the spirit and scope of the invention as hereinafter claimed.

What is claimed is:

1. A seat assembly comprising:
   a seat tube having a first end and a second end, said first end thereof having two wedge-shaped recesses defined diametrically opposite in an inner periphery thereof and said second end thereof having an end cap fixedly received therein;
   a seat post axially movable and received in said seat tube and having two plain portions defined diametrically opposite in an outer periphery thereof;
   a clamping member securely attached to said seat post, and
   two blocks, each of said block respectively received in one of said wedge-shaped recesses and located between one of said plain portions of said seat post and said first end of said seat tube whereby said blocks cooperate with said two plain portions to prevent rotation of said seat post.

2. The seat assembly as claimed in claim 1 wherein said first end of said seat tube has a first threaded periphery defined in an outer periphery thereof so that a nut member is threadedly engaged therewith to retain said two blocks in position.

3. The seat assembly as claimed in claim 1 wherein a spring is received between said second end of said seat tube and said seat post.

* * * * *